United States Patent
Valeriano et al.

(10) Patent No.: US 10,191,705 B2
(45) Date of Patent: Jan. 29, 2019

(54) MECHANISMS TO ENABLE FIFO BEHAVIOR FOR SELECTED WORKFLOW TASKS IN MULTI-DOCUMENT JOBS

(71) Applicant: XEROX Corporation, Norwalk, CT (US)

(72) Inventors: Francisco M. Valeriano, Torrance, CA (US); Sherry Siu-Ling Tan, Rancho Palos Verdes, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/702,854

(22) Filed: May 4, 2015

(65) Prior Publication Data

US 2016/0328193 A1   Nov. 10, 2016

(51) Int. Cl.
   *G06F 3/12*        (2006.01)
(52) U.S. Cl.
   CPC ............ *G06F 3/1275* (2013.01); *G06F 3/122* (2013.01); *G06F 3/1215* (2013.01); *G06F 3/1241* (2013.01); *G06F 3/1263* (2013.01); *G06F 3/1296* (2013.01)
(58) Field of Classification Search
   CPC ........ G06F 3/1215; G06F 3/122; G06F 3/126; G06F 3/1296; G06F 3/1275; G06F 9/3855; G06F 2209/548; G06F 3/1241; G06F 3/1263; G06F 3/1264; G06F 3/1291
   USPC ....................................................... 358/1.15
   See application file for complete search history.

(56) References Cited

U.S. PATENT DOCUMENTS

| | | |
|---|---|---|
| 6,411,314 B1 | 6/2002 | Hansen et al. |
| 7,389,335 B2 | 6/2008 | MacLeod et al. |
| 7,548,335 B2 | 6/2009 | Lawrence et al. |
| 7,802,174 B2 | 9/2010 | Teng et al. |
| 7,933,965 B2 | 4/2011 | Bonar et al. |
| 7,983,943 B2 | 7/2011 | Morales et al. |
| 8,424,011 B2 | 4/2013 | Barros et al. |
| 8,909,597 B2 | 12/2014 | Aymeloglu et al. |

(Continued)

FOREIGN PATENT DOCUMENTS

| | | |
|---|---|---|
| CN | 1808415 | 7/2006 |
| KR | 1020130015841 | 2/2013 |

(Continued)

*Primary Examiner* — Benny Q Tieu
*Assistant Examiner* — Juan M Guillermety
(74) *Attorney, Agent, or Firm* — Gibb & Riley, LLC

(57) ABSTRACT

During processing of job documents in a document processing workflow, execution of the workflow is stopped at a previously defined first sequentially processed node until no more of the job documents can be directed to the first sequentially processed node by the workflow. Then, the job documents that have been stopped at the first sequentially processed node are arranged in a document order, and the sequentially processed nodes are executed for each of the multiple job documents that have been stopped (and such job documents are processed one at a time through the sequentially processed nodes). Thus, execution waits until an immediately previous one of the job documents (in the document order) has finished processing at a previously defined last sequentially processed node before starting processing an immediately subsequent one of the job documents (in the document order) at the first sequentially processed node.

15 Claims, 4 Drawing Sheets

(56) References Cited

U.S. PATENT DOCUMENTS

| | | | |
|---|---|---|---|
| 2001/0055123 A1* | 12/2001 | Ryan | G06F 3/1275 |
| | | | 358/1.12 |
| 2004/0237087 A1* | 11/2004 | Ye | G06F 9/4881 |
| | | | 718/101 |
| 2005/0043845 A1 | 2/2005 | Wiechers | |
| 2005/0043848 A1 | 2/2005 | Wiechers | |
| 2007/0127057 A1* | 6/2007 | Bridges | G06F 3/1207 |
| | | | 358/1.15 |
| 2008/0147467 A1 | 6/2008 | Daum | |
| 2008/0165379 A1 | 7/2008 | Zuber | |
| 2008/0300707 A1* | 12/2008 | Ruml | G06F 3/1215 |
| | | | 700/101 |
| 2009/0025002 A1* | 1/2009 | Rai | G06F 3/1262 |
| | | | 718/102 |
| 2009/0225344 A1 | 9/2009 | deBeus | |
| 2010/0195141 A1* | 8/2010 | Fan | G06F 3/126 |
| | | | 358/1.15 |
| 2012/0212762 A1* | 8/2012 | Tsukuba | H04N 1/3255 |
| | | | 358/1.15 |
| 2012/0288298 A1* | 11/2012 | Toriyabe | G03G 15/5083 |
| | | | 399/82 |
| 2013/0208315 A1 | 8/2013 | Zeng et al. | |
| 2013/0242346 A1* | 9/2013 | Nakamichi | G06F 3/1296 |
| | | | 358/1.15 |
| 2014/0002854 A1* | 1/2014 | Banner | G06F 3/1275 |
| | | | 358/1.15 |
| 2016/0299726 A1* | 10/2016 | Hayashi | G06F 3/1275 |

FOREIGN PATENT DOCUMENTS

| | | |
|---|---|---|
| WO | 0058873 | 10/2000 |
| WO | 2012044320 | 4/2012 |

\* cited by examiner

MECHANISMS TO ENABLE FIFO BEHAVIOR FOR SELECTED WORKFLOW TASKS IN MULTI-DOCUMENT JOBS

BACKGROUND

Systems and methods herein generally relate to document workflow automation systems and more particularly to providing mechanisms to enable FIFO behavior for selected workflow tasks in multi-document jobs.

In a document workflow automation system, a workflow description specifies a set of transformations that are applied to the document(s) of a job to produce a particular output. These transformations are cumulative insomuch that the output of a node in the workflow is the input of the following node. In the execution of the workflow, in addition to the sequential processing, a document may be routed to one of many possible branches: the document may loop back to a previous point of the workflow; a document may be split into multiple documents and multiple documents may be joined into single document; etc. What happens to each of the documents depends not only on the workflow specification but also on the characteristics of the document itself such as the presence of color, the number of pages, the media used, etc. Simple jobs may contain a single document, while complex jobs may contain multiple related documents. Given that each document in a multi-document job would use a different set of transformations, each of the documents that traverse the workflow is in an independent thread of execution.

One of the nodes that can be specified in a workflow is the operation of sending the document to an output destination, and in particular to a production printing device. When a multi-document job is sent to a workflow, it is sometimes mandated that the order in which the documents are printed at a particular device corresponds to the order that was given to the documents when they were submitted to the workflow. This is sometimes referred to as a first-in, first-out (FIFO) ordering. For example, a workflow may be printing different chapters of a book, and the chapters should be printed in sequential order to allow the printed pages of the book to be assembled in the same order that the chapters are ordered.

This FIFO request is compounded by the fact that some printers do not guarantee a FIFO behavior. For example, one may finish the submission of a large document to the device before they start the submission of a small document to the same queue of the device. Nevertheless, because the large document takes more time to process at the device (e.g., raster image processing (RIP)), the printing of the smaller document may be completed first. This desired printing behavior is just one example of document processing operations that should be executed in a specific sequential order corresponding to the order given at job submission time. For example, collation of corresponding documents also has similar requirements.

Given the workflow execution model, documents that belong to the same job may arrive at any printing node (or any node for that matter) out of the requested sequential order. Also, the documents that arrive to the printing node may not have a direct correspondence to the input documents as they may have been derived through split and join operations. Documents could be routed to different branches on the workflow, without one being able to determine in advance how many documents would actually reach any given print node at any given point in the workflow.

One challenge is to extend the job specification and the workflow engine capabilities to enable FIFO behavior, while at the same time maintaining efficiency on utilization of resources at the workflow engine.

SUMMARY

Document process workflow methods herein identify a beginning sequential process (BSP) node and a corresponding end sequential process (ESP) node in a document processing workflow, and this also identifies sequential processed nodes between the BSP node and the ESP node. The methods herein process multiple job documents in the document processing workflow by printing and finishing documents using printing and finishing machines. During such processing of job documents in the document process workflow, when encountering the BSP node, these processes stop execution of the document process workflow at the BSP node until no more of the job documents can be directed to the BSP node by the document processing workflow.

After no more of the job documents can be directed to the BSP node by the document process workflow, these methods order the job documents that have been stopped at the BSP node in a depth-first order. After the ordering the documents in the depth-first order, these methods execute the sequentially processed nodes for each of the job documents that have been stopped at the BSP node in the depth-first order, and process only one of the job documents at a time through the sequentially processed nodes. Thus, these document process workflow methods wait until the immediately previous one of the job documents (in the depth-first order) has finished processing at the ESP node before starting processing an immediately subsequent one of the job documents (in the depth-first order) at the BSP node.

The depth-first order is based on the document ancestry tree of the document processing workflow, and the document ancestry tree defines how the job documents were input and derived from other documents. The sequentially processed nodes do not include branches, splits, or joint nodes; are not properly capable of being processed in parallel (according to the workflow requirements); and comprise a subset of less than all processed nodes in the document processing workflow.

Document process workflow systems include, among other components, a plurality of document processing machines that print documents and process printed documents, and at least one computerized device that controls the document processing machines as they are executing a document process workflow on job documents. The computerized device is used to identify a begin sequential process (BSP) node and a corresponding end sequential process (ESP) node in the document process workflow, and this identifies sequentially processed nodes between the BSP node and the ESP node.

When encountering a BSP node (during processing of job documents in the document process workflow) the computerized device automatically stops execution of the document processing workflow at the BSP node until the computerized device identifies that no more of the job documents can be directed to the BSP node by the document processing workflow. After no more of the job documents can be directed to the BSP node by the document process workflow, the computerized device automatically orders the job documents that have been stopped at the BSP node in a depth-first order. After the ordering the job documents in the depth-first order, the computerized device automatically executes the sequentially processed nodes for each of the job documents that have been stopped at the BSP node (in the depth-first order) by processing only one of the job documents at a time through the sequentially processed nodes. Thus, the computerized device automatically executes the sequentially processed nodes by waiting until an immediately previous one of the job documents (in the depth-first order) has finished processing at the ESP node before starting processing of an immediately subsequent one of the job documents (in the depth-first order) at the BSP node.

Again, the depth-first order is based on a document ancestry tree of the document process workflow, and the document ancestry tree defines how the job documents were input and derived from other documents. The sequentially processed nodes do not include branches, splits, or joint nodes; are not properly capable of being processed in parallel (according to the workflow requirements); and comprise a subset of less than all processed nodes in the document processing workflow.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
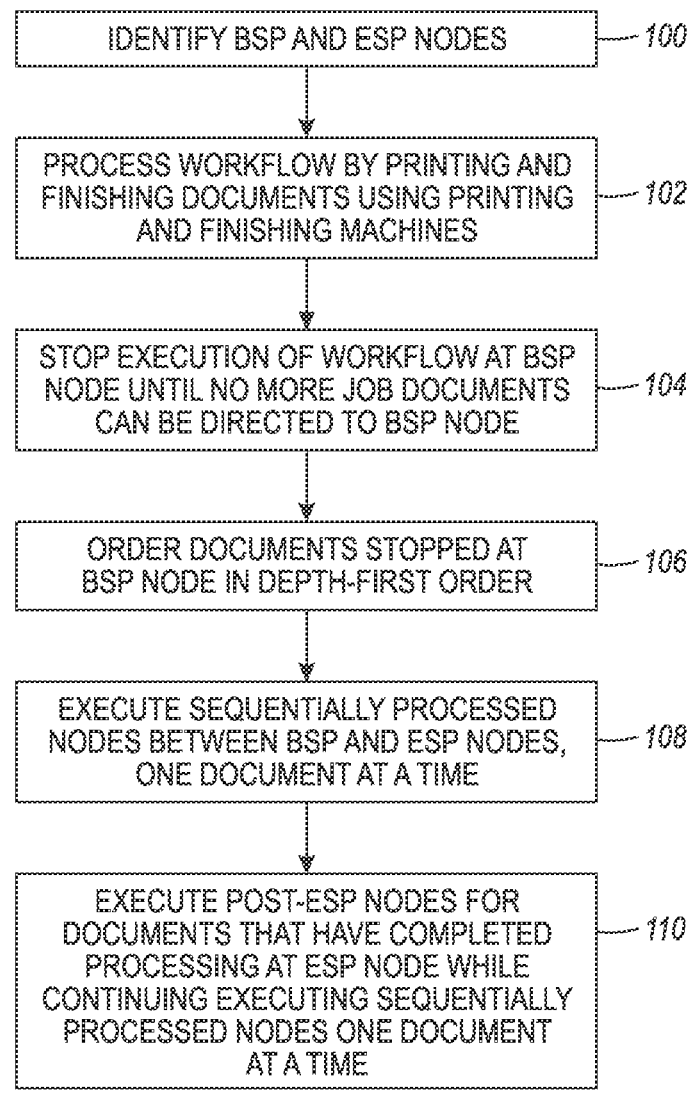
FIG. 1 is a flow diagram of various methods herein.

As mentioned above, one challenge when using document workflow processing is to extend the job specification and the workflow engine capabilities to enable FIFO behavior, while at the same time maintaining efficiency on utilization of resources at the workflow engine. In view of this, the systems and methods herein provide mechanisms to enable FIFO behavior for selected workflow tasks in multi-document jobs.

The systems and method herein provide an enhanced workflow processing engine that can process documents of a multi-document job in the order they were submitted, for one or more specified subsets of nodes in the workflow. The workflow specification capabilities are augmented with two constructs: a "begin sequential process (BSP)" node and a corresponding "end sequential process (ESP)" node. When the workflow engine encounters a BSP node, the engine stops the execution of the document. The engine does the same for all subsequent documents that arrive at that node until it identifies that no more documents can arrive to the BSP node before the sequential process is completed. Once that happens, the documents at the node are ordered using their depth-first order in the document ancestry tree. Once ordered, the first document of the sorted list continues execution in the workflow. Once that first document reaches the ESP node, or it enters an error or terminal state, the workflow engine makes the second document of the list ready for execution. This is repeated until all documents in the list have reached a terminal state or have gone past the ESP node.

The BSP and ESP nodes could be added as a pair at any point in the workflow graph. In between these two nodes, one can add one or many nodes that will be executed following an order corresponding to the submission order for multi-document jobs. The nodes that are between the BSP and the ESP nodes follow a sequential processing. This means that no branching, splitting, or joining are allowed in between a pair of corresponding BSP and ESP nodes.

For example, in the particular case of FIFO printing, the two nodes that are between the BSP and ESP nodes can include a node that submits the document as a print job to a printer, and a second node that waits for the printer to tell the workflow engine that printing has started for that particular print job.

At workflow execution time, when the workflow engine is processing a document and it encounters a BSP node, the workflow engine stops the execution of the document until all the documents that can possibly reach that same BSP node do so. This is the same approach used for join nodes: when a document reaches a join node, it stops execution to wait for other documents that could possibly reach that same join node.

Once all the documents of a job have reached a terminal state or are stopped at a join node or a BSP node, one of those nodes (either a join node or a BSP node) will be selected for execution based on a topological order of those nodes in the workflow. The node that is selected to be processed first is one that is not affected by the output of any one of the other candidate nodes.

If the node to be executed is a BSP node, when it is time to execute the node, all the documents that are at the BSP node are placed in a list and ordered using the depth-first order in the document ancestry tree. The document ancestry tree contains all the documents that are currently active in the system as leaves of the tree and the structure of the tree describes how the current set of active documents were derived from other documents. When the input documents are first submitted to the workflow, all these documents are added to the tree as nodes directly connected to the root of the tree and ordered in the same order as the input documents were on submission. Whenever a document goes through a split node, the new output documents produced by the split node are added to the tree as children nodes of the document that was input to the split node. The order in which these children nodes are added to the tree corresponds to the order of the output documents that are identified by the split node. Also, whenever a set of documents goes through a join node to produce a single output document, their corresponding leaves in the ancestry tree are removed with the exception of the lowest order leaf node in the depth first order of nodes in the tree. That lowest order leaf becomes the representation of the output document of the join operation.

Once the list of documents in the BSP node has been ordered, the workflow engine takes the first document in the list and makes it ready for execution. This means that the document would start executing when a workflow engine thread becomes available, based on the scheduling algorithm of the engine. Eventually that document would start executing in the workflow engine and the nodes between the BSP and the ESP would process for that document in a sequential order.

When the first document reaches the ESP node or it enters a terminal state (e.g., when the document aborts in one of the nodes in between the BSP and ESP nodes), the ESP node notifies the workflow engine to change the state of the next document in the sorted list to make it ready for execution. Notice that the document that just reached the ESP node is going to continue processing the post-ESP nodes in the workflow, while at the same time the second document in the list may start processing on a different thread of the workflow engine. The same happens when the second document reaches the ESP node or enters a terminal state. The ESP node notifies the engine to make the next document in the list ready for execution. This continues until no more documents are left on the sorted list. At that point, the execution of that particular BSP node is complete.

Depending on the workflow, the selection algorithm may be triggered multiple times in the processing of a job to choose the next BSP or join node to process. Whenever all the documents for a particular job are waiting at join nodes or BSP nodes, the selection process is invoked to find the next BSP or join node to process.

Therefore, stated very generically, systems and methods identify a subset of nodes of a document processing workflow as sequentially processed nodes between a first sequentially processed node and a last sequentially processed node. Such systems and methods process multiple job documents in the document processing workflow by printing and finishing documents using printing and finishing machines.

During the processing of the multiple job documents in the document processing workflow, these systems and methods stop execution of the document processing workflow at the first sequentially processed node until no more of the multiple job documents can be directed to the first sequentially processed node by the document processing workflow. Then, such systems and methods arrange the multiple job documents that have been stopped at the first sequentially processed node in a document order. Also, the systems and methods execute the sequentially processed nodes for each of the multiple job documents that have been stopped at the first sequentially processed node in the document order by processing only one of the multiple job documents at a time through the sequentially processed nodes. Thus, the systems and methods execute the sequentially processed nodes by waiting until an immediately previous one of the multiple job documents (in the document order) has finished processing at the last sequentially processed node before starting processing an immediately subsequent one of the multiple job documents (in the document order) at the first sequentially processed node.

FIG. 1 is flowchart illustrating exemplary methods herein. In item 100, these exemplary methods identify a beginning sequential process (BSP) node and a corresponding end sequential process (ESP) node in a document processing workflow, and this also identifies sequential processed nodes between the BSP node and the ESP node. In item 102, these methods process multiple job documents in the document processing workflow by printing and finishing documents using printing and finishing machines.

During such processing of job documents in the document process workflow, when encountering the BSP node as shown in item 104, these processes stop execution of the document process workflow at the BSP node until no more of the job documents can be directed to the BSP node by the document processing workflow.

After no more of the job documents can be directed to the BSP node by the document process workflow in item 104, these methods order the job documents that have been stopped at the BSP node in a depth-first order (in item 106). After the ordering the documents in the depth-first order in item 106, these methods execute the sequentially processed nodes for each of the job documents that have been stopped at the BSP node in the depth-first order in item 108, and the execution in item 108 processes only one of the job documents at a time through the sequentially processed nodes. Thus, the execution in item 108 waits until the immediately previous one of the job documents (in the depth-first order) has finished processing at the ESP node before starting processing an immediately subsequent one of the job documents (in the depth-first order) at the BSP node.

In item 110, these methods execute all post-ESP nodes according to the document processing workflow for all documents that have completed processing at the ESP node, while continuing executing the sequentially processed nodes for documents still waiting at the BSP node, one document at a time. In other words, in item 110, the remainder of the workflow that follows the ESP node is completed for all documents that have passed the ESP node, without waiting for all documents still waiting at the BSP node to be processed one document at a time through the sequentially processed nodes that are between the BSP and ESP nodes.

Again, the depth-first order is based on the document ancestry tree of the document processing workflow, and the document ancestry tree defines how the job documents were input and derived from other documents. The sequentially processed nodes are devoid of branches, split, or joint nodes; are incapable of being processed in parallel; and comprise a subset of less than all processed nodes in the document processing workflow. In other words, the depth-first order begins as the order in which the documents were input to be processed. The depth-first order is changed from the strict input order so as to accommodate documents that are derived from other documents (where such previous documents must be in existence before subsequently derived documents can be processed), split documents, branches, joins, etc.

The hardware described herein plays a significant part in permitting the foregoing method to be performed, rather than function solely as a mechanism for permitting a solution to be achieved more quickly, (i.e., through the utilization of a computer for performing calculations).

As would be understood by one ordinarily skilled in the art, the processes described herein cannot be performed by human alone (or one operating with a pen and a pad of paper) and instead such processes can only be performed by a machine (especially when the volume of data being processed, and the speed at which such data needs to be evaluated is considered). For example, the automated control of printing and finishing equipment requires the use of computers, printers, finishing equipment, etc.

Additionally, the methods herein solve many highly complex technological problems. For example, as mentioned above, documents that belong to the same job may arrive at any printing node (or any node for that matter) out of the requested sequential order. Also, the documents that arrive to the printing node may not have a direct correspondence to the input documents as they may have been derived through split and join operations. Documents could be routed to different branches on the workflow, without one being able to determine in advance how many documents would actually reach any given print node at any given point in the workflow. Methods herein solve this technological problem by waiting until an immediately previous one of the multiple job documents (in the document order) has finished processing at the last sequentially processed node before starting processing an immediately subsequent one of the multiple job documents (in the document order) at the first sequentially processed node.

Figure 2:
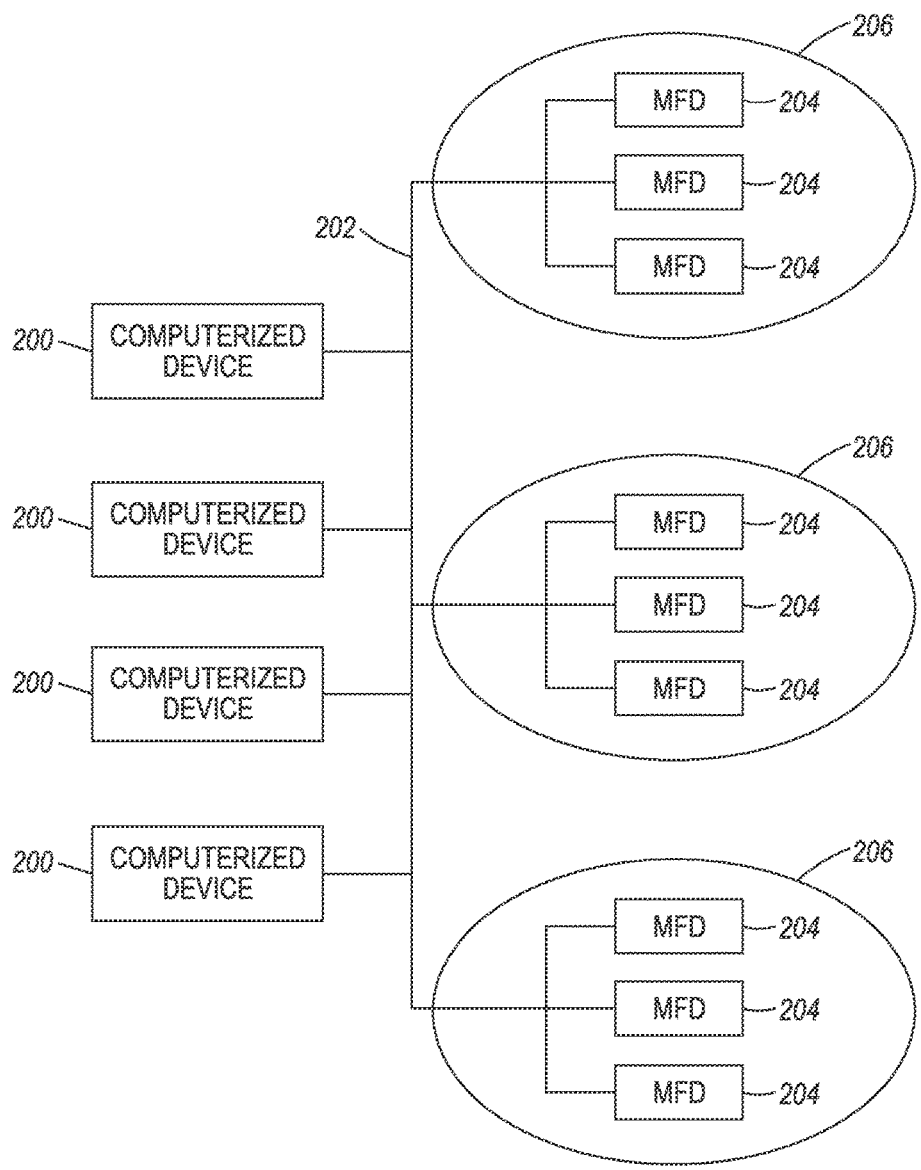
FIG. 2 is a schematic diagram illustrating systems herein.

As shown in FIG. 2, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 3:
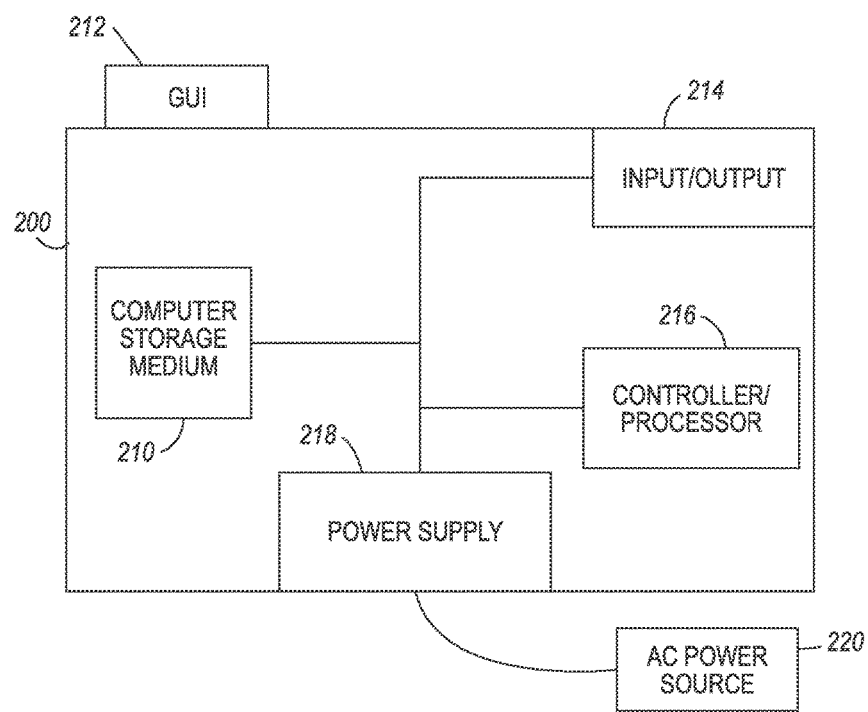
FIG. 3 is a schematic diagram illustrating devices herein.

FIG. 3 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 3, a body housing has one or more functional components that operate on power supplied from an alternating current (AC) source 220 by the power supply 218. The power supply 218 can comprise a common power conversion unit, power storage element (e.g., a battery, etc), etc.

Figure 4:
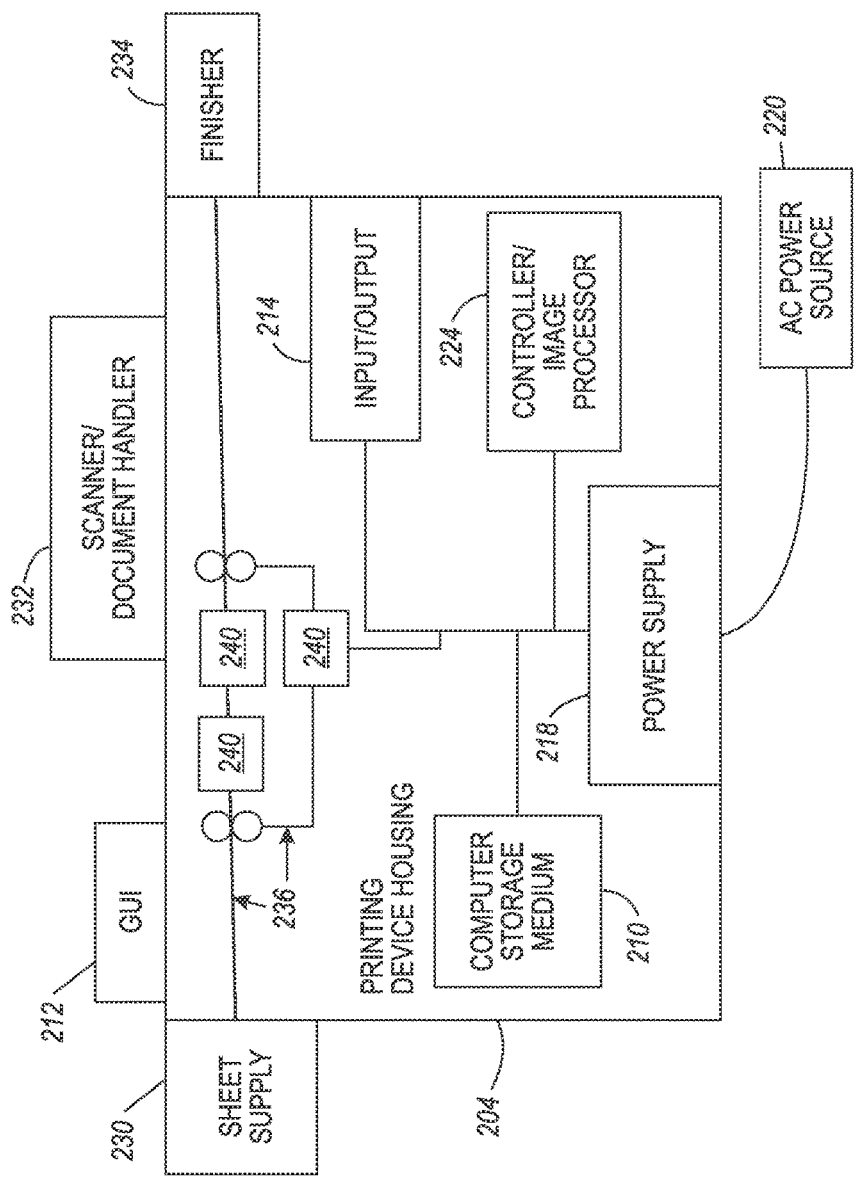
FIG. 4 is a schematic diagram illustrating devices herein.

FIG. 4 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, bind, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.). As would be understood by those ordinarily skilled in the art, the printing device 204 shown in FIG. 4 is only one example and the systems and methods herein are equally applicable to other types of printing devices that may include fewer components or more components. For example, while a limited number of printing engines and paper paths are illustrated in FIG. 4, those ordinarily skilled in the art would understand that many more paper paths and additional printing engines could be included within any printing device used with systems and methods herein.

Thus, document process workflow systems herein include, among other components, a plurality of document processing machines 204 that print documents and process printed documents, and at least one computerized device 200 that controls the document processing machines 204 as they are executing a document process workflow on job documents. The computerized device 200 is used to identify a begin sequential process (BSP) node and a corresponding end sequential process (ESP) node in the document process workflow, and this identifies sequentially processed nodes between the BSP node and the ESP node.

When encountering a BSP node (during processing of job documents in the document process workflow) the computerized device 200 automatically stops execution of the document processing workflow at the BSP node until the computerized device 200 identifies that no more of the job documents can be directed to the BSP node by the document processing workflow. After no more of the job documents can be directed to the BSP node by the document process workflow, the computerized device 200 automatically orders the job documents that have been stopped at the BSP node in a depth-first order.

After the ordering the job documents in the depth-first order, the computerized device 200 automatically executes the sequentially processed nodes for each of the job documents that have been stopped at the BSP node (in the depth-first order) by processing only one of the job documents at a time through the sequentially processed nodes. Thus, the computerized device 200 automatically executes the sequentially processed nodes by waiting until an immediately previous one of the job documents (in the depth-first order) has finished processing at the ESP node before starting processing of an immediately subsequent one of the job documents (in the depth-first order) at the BSP node.

Again, the depth-first order is based on a document ancestry tree of the document process workflow, and the document ancestry tree defines how the job documents were input and derived from other documents. The sequentially processed nodes do not include branches, splits, or joint nodes; are not properly capable of being processed in parallel (according to the workflow requirements); and comprise a subset of less than all processed nodes in the document processing workflow.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicant does not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A document processing workflow method comprising:
    receiving a document processing workflow identifying a depth-first order in which to process job documents through nodes of said document processing workflow, each of said nodes comprising a different processing operation applied to said job documents, and each of said job documents that traverse said nodes of said document processing workflow is in an independent thread of execution, and each said thread of execution performs initial printing of a document to produce a printed document, and transforms said printed document after said initial printing by performing additional processing operations on said printed document at said nodes, wherein transformations performed on said printed document after said initial printing are cumulative insomuch that output of one of said nodes in said document processing workflow is input of a following node, and output of said thread of execution is a single one of said job documents;
    identifying a begin sequential process (BSP) node and a corresponding end sequential process (ESP) node in a subset of said document processing workflow to identify sequentially processed nodes between said BSP node and said ESP node using a computerized device;
    executing nodes of said document processing workflow previous to said BSP node by printing documents using machines as controlled by said computerized device;
    when encountering said BSP node during processing of job documents in workflow nodes preceding said subset of said document processing workflow, stopping execution of said document processing workflow at said BSP node by automatically controlling said machines using said computerized device until no more of said job documents can be directed to said BSP node by said document processing workflow, said BSP node receiving at least some of said job documents out of said depth-first order;
    after no more of said job documents can be directed to said BSP node by said document processing workflow, changing the order of said job documents that have been stopped at said BSP node to said depth-first order by automatically controlling said machines using said computerized device;
    after said changing the order of said job documents, executing said sequentially processed nodes for each of said job documents that have been stopped at said BSP node in said depth-first order by processing only one of said job documents at a time through said sequentially processed nodes by waiting until an immediately previous one of said job documents in said depth-first order has finished processing at said ESP node before starting processing an immediately subsequent one of said job documents in said depth-first order at said BSP node by automatically controlling said machines using said computerized device; and
    processing workflow nodes subsequent to said subset of said document processing workflow after finishing processing at said ESP node by automatically controlling said machines using said computerized device.

2. The document processing workflow method of claim 1, said depth-first order being based on a document ancestry tree of said document processing workflow.

3. The document processing workflow method of claim 2, said document ancestry tree defining how said job documents were input and derived from other documents.

4. The document processing workflow method of claim 1, said sequentially processed nodes being devoid of branching, splitting, or joining nodes.

5. The document processing workflow method of claim 1, said sequentially processed nodes being incapable of being processed in parallel.

6. A method comprising:
    receiving a document processing workflow identifying a document order in which to process job documents through nodes of said document processing workflow, each of said nodes comprising a different processing operation applied to said job documents, and each of said job documents that traverse said nodes of said document processing workflow is in an independent thread of execution, and each said thread of execution performs initial printing of a document to produce a printed document, and transforms said printed document after said initial printing by performing additional processing operations on said printed document at said nodes, wherein transformations performed on said printed document after said initial printing are cumulative insomuch that output of one of said nodes in said document processing workflow is input of a following node, and output of said thread of execution is a single one of said job documents;
    identifying a subset of nodes of said document processing workflow as sequentially processed nodes between a first sequentially processed node and a last sequentially processed node using a computerized device;
    processing said job documents through nodes of said document processing workflow previous to said first sequentially processed node by printing and finishing documents using printing and finishing machines as controlled by said computerized device;
    during said processing of said job documents in workflow nodes preceding said subset of said document processing workflow, stopping execution of said document processing workflow at said first sequentially processed node by automatically controlling said printing and finishing machines using said computerized device until no more of said job documents can be directed to said first sequentially processed node by said document processing workflow, said first sequentially processed node receiving at least some of said job documents out of said document order;

changing the order of said job documents that have been stopped at said first sequentially processed node to said document order by automatically controlling said printing and finishing machines using said computerized device;

executing said sequentially processed nodes for each of said job documents that have been stopped at said first sequentially processed node in said document order by processing only one of said job documents at a time through said sequentially processed nodes by waiting until an immediately previous one of said job documents in said document order has finished processing at said last sequentially processed node before starting processing an immediately subsequent one of said job documents in said document order at said first sequentially processed node by automatically controlling said printing and finishing machines using said computerized device; and processing workflow nodes subsequent to said subset of said document processing workflow after finishing processing at said last sequentially processed node by automatically controlling said printing and finishing machines using said computerized device.

7. The method of claim 6, said document order being based on a document ancestry tree of said document processing workflow.

8. The method of claim 7, said document ancestry tree defining how said job documents were input and derived from other documents.

9. The method of claim 6, said sequentially processed nodes being devoid of branching, splitting, or joining nodes.

10. The method of claim 6, said sequentially processed nodes being incapable of being processed in parallel.

11. A document processing workflow system comprising:
a plurality of document processing machines printing documents and processing printed documents; and
a computerized device automatically controlling said plurality of document processing machines executing a document processing workflow of job documents, said document processing workflow identifying a depth-first order in which to process job documents through nodes of said document processing workflow, each of said nodes comprising a different processing operation applied to said job documents using said document processing machines, and each of said job documents that traverse said nodes of said document processing workflow is in an independent thread of execution, and each said thread of execution performs initial printing of a document to produce a printed document using said document processing machines, and transforms said printed document after said initial printing by performing additional processing operations on said printed document at said nodes using said document processing machines, wherein transformations performed on said printed document after said initial printing are cumulative insomuch that output of one of said nodes in said document processing workflow is input of a following node, and output of said thread of execution is a single one of said job documents;

said computerized device being used to identify a begin sequential process (BSP) node and a corresponding end sequential process (ESP) node in subset of said document processing workflow to identify sequentially processed nodes between said BSP node and said ESP node, said computerized device executing nodes of said document processing workflow previous to said BSP node by automatically controlling said document processing machines, when encountering a BSP node during processing of job documents in workflow nodes preceding said subset of said document processing workflow, said computerized device automatically stopping execution of said document processing workflow at said BSP node for all said job documents that would be directed to said BSP node by said document processing workflow by automatically controlling said document processing machines until said computerized device identifies that no more of said job documents can be directed to said BSP node by said document processing workflow, said BSP node receiving at least some of said job documents out of said depth-first order, after no more of said job documents can be directed to said BSP node by said document processing workflow, said computerized device automatically changing the order of said job documents that have been stopped at said BSP node to said depth-first order la automatically controlling said document processing machines;

after said changing the order of said job documents, said computerized device automatically executing said sequentially processed nodes for each of said job documents that have been stopped at said BSP node in said depth-first order by processing only one of said job documents at a time through said sequentially processed nodes by waiting until an immediately previous one of said job documents in said depth-first order has finished processing at said ESP node before starting processing an immediately subsequent one of said job documents in said depth-first order at said BSP node by automatically controlling said document processing machines; and said computerized device automatically processing workflow nodes subsequent to said subset of said document processing workflow after finishing processing at said ESP node by automatically controlling said document processing machines.

12. The document processing workflow system of claim 11, said depth-first order being based on a document ancestry tree of said document processing workflow.

13. The document processing workflow system of claim 12, said document ancestry tree defining how said job documents were input and derived from other documents.

14. The document processing workflow system of claim 11, said sequentially processed nodes being devoid of branching, splitting, or joining nodes.

15. The document processing workflow system of claim 11, said sequentially processed nodes being incapable of being processed in parallel.

* * * * *